United States Patent
Hölscher et al.

(10) Patent No.: US 12,150,546 B2
(45) Date of Patent: Nov. 26, 2024

(54) CANTILEVER RACK

(71) Applicant: Hölscher Holding GmbH, Kerpen (DE)

(72) Inventors: Andreas Hölscher, Cologne (DE); Michael Beil, Blumberg (DE)

(73) Assignee: HÖLSCHER HOLDING GMBH, Kerpen (DE)

( * ) Notice: Subject to any disclaimer, the term of this patent is extended or adjusted under 35 U.S.C. 154(b) by 0 days.

(21) Appl. No.: 18/256,729

(22) PCT Filed: Dec. 13, 2021

(86) PCT No.: PCT/EP2021/085562
§ 371 (c)(1),
(2) Date: Jun. 9, 2023

(87) PCT Pub. No.: WO2022/123086
PCT Pub. Date: Jun. 16, 2022

(65) Prior Publication Data
US 2024/0023707 A1    Jan. 25, 2024

(30) Foreign Application Priority Data
Dec. 11, 2020   (DE) .......................... 202020005145.4

(51) Int. Cl.
*A47B 47/02* (2006.01)
*A47B 96/14* (2006.01)

(52) U.S. Cl.
CPC ............ *A47B 47/022* (2013.01); *A47B 96/14* (2013.01); *A47B 2230/0074* (2013.01)

(58) Field of Classification Search
CPC .......... A47B 47/022; A47B 2230/0074; A47B 57/18; A47B 96/027; A47B 96/061;
(Continued)

(56) References Cited

U.S. PATENT DOCUMENTS

| | | | | |
|---|---|---|---|---|
| 1,380,570 A | * | 6/1921 | Lehman | ............... A47B 81/005 211/60.1 |
| 3,003,759 A | * | 10/1961 | Frederick | ........... A47B 96/1408 269/299 |

(Continued)

FOREIGN PATENT DOCUMENTS

| | | |
|---|---|---|
| DE | 7429023 U | 3/1975 |
| DE | 602005002317 T2 | 5/2008 |

(Continued)

OTHER PUBLICATIONS

International Searching Authority. International Search Report and Written Opinion for PCT Application No. PCT/EP2021/085562 and English translation, mailed Mar. 28, 2022, pp. 1-4.

*Primary Examiner* — Jennifer E. Novosad
(74) *Attorney, Agent, or Firm* — Vivacqua Crane, PLLC

(57) ABSTRACT

A cantilever rack having two uprights (1) and cantilever arms (10) is disclosed, each upright (1) having two parallel rows of holes arranged in the longitudinal direction of the uprights for height-adjustable attachment of the cantilever arms (10). Each upright (1) of the cantilever rack in the upright profile (2) consists of sheets with C-profiles, which are connected to each other with an internal screw connection, whereby the internal screw connection is accessible from the outside.

11 Claims, 4 Drawing Sheets

Figure 1:
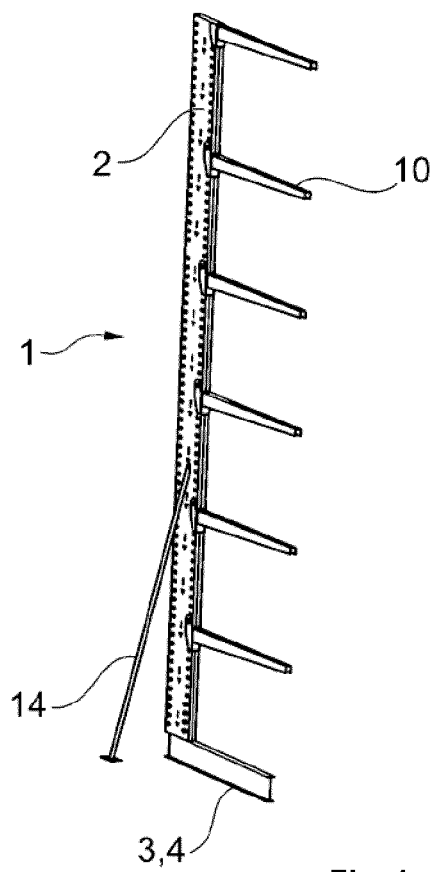

(58) Field of Classification Search
CPC . A47B 96/14; A47B 96/1408; A47B 96/1433; A47B 96/145; A47B 96/1458; A47B 96/1483; A47F 5/103
USPC .............................. 211/90.01, 191, 193, 192
See application file for complete search history.

(56) References Cited

U.S. PATENT DOCUMENTS

| | | | | |
|---|---|---|---|---|
| 3,127,020 | A * | 3/1964 | Bibb | A47B 96/04 403/374.4 |
| 3,212,648 | A * | 10/1965 | Baker, Jr. | A47B 57/50 108/108 |
| 3,512,654 | A * | 5/1970 | Jay | A47B 96/145 411/356 |
| 3,545,626 | A * | 12/1970 | Seiz | A47B 57/485 211/187 |
| 3,602,374 | A * | 8/1971 | Alabaster | A47B 57/485 211/193 |
| 3,606,024 | A * | 9/1971 | Mieville | E04C 2/40 211/187 |
| 3,747,777 | A * | 7/1973 | Kane | A47B 57/30 211/193 |
| 4,221,443 | A * | 9/1980 | Heaney | F25D 25/02 312/111 |
| 4,286,719 | A * | 9/1981 | Hall | A47B 57/52 211/193 |
| 4,396,125 | A * | 8/1983 | Rowader | A47B 57/52 211/193 |
| 4,426,011 | A * | 1/1984 | Jay | A47B 96/061 211/193 |
| 4,989,737 | A * | 2/1991 | Chapman | F16B 12/02 211/208 |
| 5,161,701 | A * | 11/1992 | Berny | A47B 47/022 108/108 |
| 5,170,898 | A * | 12/1992 | Katz | A47G 25/0664 248/245 |
| 5,593,049 | A * | 1/1997 | Farham | H02G 3/288 211/1 |
| 5,938,047 | A * | 8/1999 | Ellis | B65G 1/0442 414/331.11 |
| 11,678,742 | B1* | 6/2023 | Hogeback | A47B 57/404 211/74 |
| 2024/0023707 | A1* | 1/2024 | Hölscher | A47B 47/022 |

FOREIGN PATENT DOCUMENTS

| | | | | |
|---|---|---|---|---|
| EP | 1624127 A1 * | 2/2006 | | A47B 96/145 |
| FR | 833659 A | 10/1938 | | |
| FR | 2850717 A1 | 8/2004 | | |
| WO | WO-2022123086 A1 * | 6/2022 | | A47B 47/022 |

* cited by examiner

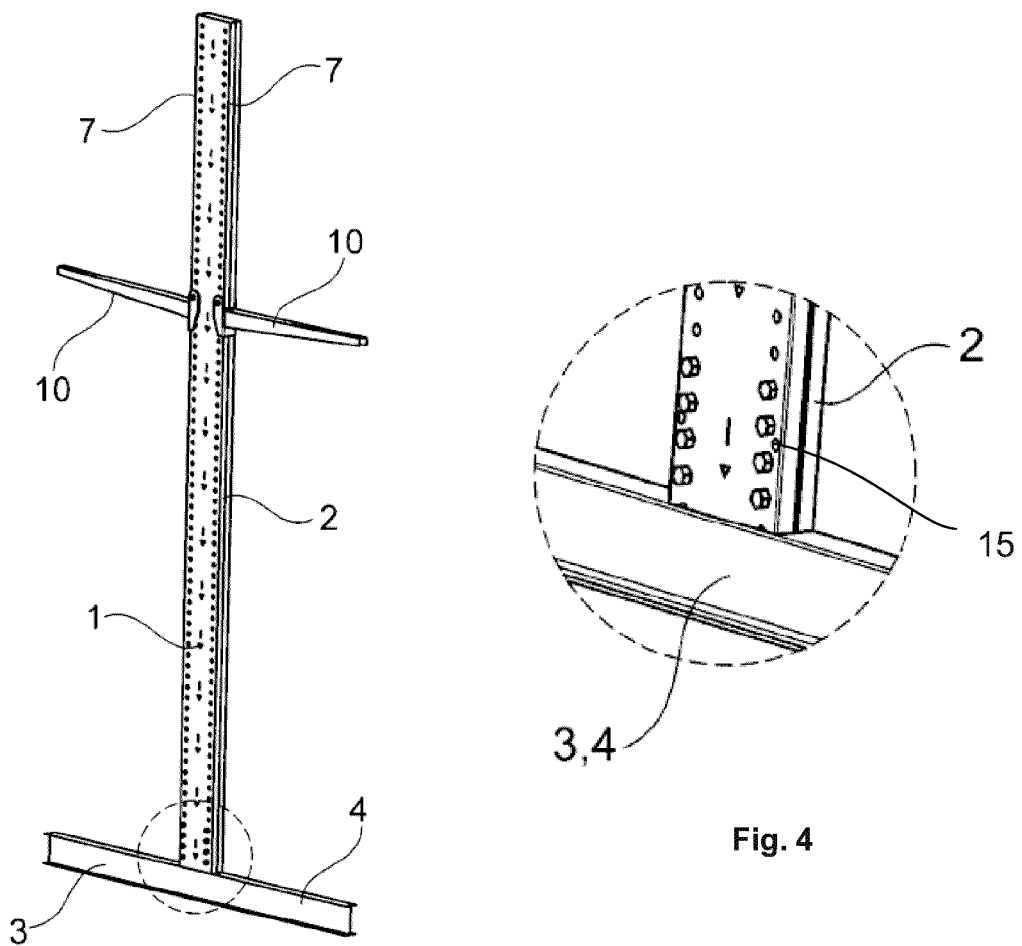
Fig. 3
Fig. 4
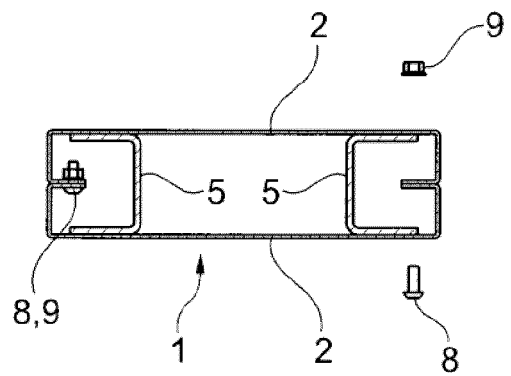
Fig. 5

CANTILEVER RACK

CROSS-REFERENCE TO RELATED APPLICATIONS

This application is a national stage filing under 35 U.S.C. § 371 of international application number PCT/EP2021/085562, filed Dec. 13, 2021, which claims priority to German patent application No. 202020005145.4, filed Dec. 11, 2020. The contents of these applications are incorporated herein by reference in their entirety.

The invention is directed to a cantilever rack having uprights and cantilever arms extending therefrom, each upright having at least two parallel rows of holes arranged in the longitudinal direction of the uprights for height-adjustable attachment of the cantilever arms, in which the fastening ends of the cantilever arms engage.

Such racks are used in particular in warehouses for storing any goods, which, if they are goods such as bars, etc., are either placed directly on the cantilever arms protruding freely from the uprights or placed on a continuous floor of boards or the like. In general, two basic systems can be distinguished, the cantilever rack made of hot-rolled structural steel profiles and the cantilever rack made of thin-walled sheet metal sections. The sheet metal profiles are clearly advantageous in terms of material usage, but also have significant weaknesses. One solution that has not been able to establish itself on the market, however, is the cantilever upright made of square tubing known from DE 35 15 260 A1, the production of which is complex and expensive.

The oldest cantilever rack system in Europe is the conical one. The conical system is made of sheet metal panels. First, two half-shells are made, which are first cut from sheet metal panels, then punched and edged. Then the two half-shells are welded together and painted. Due to high production costs, the conical sheet metal rack has been further developed and today often consists of parallel U- or C-shaped half-shell profiles that are edged or profiled and then welded together and painted. Welding and painting are complex manufacturing processes that incur correspondingly high costs. In a further development, therefore, sendzimir galvanized half-shell profiles are bolted together, thus eliminating the need for welding and painting. However, the screw connections must not lead to any protrusions (protruding screw head, screw nut) in the area of the cantilever arms to be inserted, as otherwise the cantilever arm cannot be adjusted and fixed in the height of the upright. With known systems, this leads to complex, difficult and therefore expensive to manufacture half-shell profile shapes whose assembly requires a high level of expertise.

In the case of these racks, which are made entirely of sheet metal, it is also particularly disadvantageous that during rough forklift operation the rack foot, which is very important for stability and statically, can very easily be damaged and lose its stability function for the entire rack.

In many cantilever systems, the connection between the cantilever arm and the cantilever upright plays an important role (EP 0 061 514, DE 35 15 260 A1, DE 38 32 537 C2). A movable arm has become established on the market, which deflects upwards when struck by a forklift truck. The arm itself and the customer's goods remain undamaged. It is known that the arm is fixed to the upright by means of a bolt, which is secured against falling out by means of a split pin or similar, which in turn requires mechanical processing, which can be costly, especially with a large number of arms.

Based on the aforementioned cantilever racks, which are used for the storage of mainly long products and which are correspondingly stable and capable of carrying even heavy loads, the invention is based on the task of improving a cantilever rack of the type mentioned at the beginning and designing it by simple means in such a way that the rack uprights consist of half shells which are easy to profile, which can be assembled by the end customer himself with a precise fit and without great effort, and whose rack feet remain undamaged even in rough forklift traffic.

And finally, the assembly of the first rack upright is a special challenge, because it just does not stand by itself, but in practice is held with a second forklift or assembly platform as an aid. Very many small companies usually have only one forklift and have to costly rent another forklift or lifting platform incl. transport for the assembly.

According to the invention, the problem is solved by a cantilever rack having the features of claim 1. Preferred embodiments of the invention are given in the subclaims and the following description, each of which may individually or in combination constitute an aspect of the invention.

According to the invention, an upright of the cantilever rack in the upright profile consists of two C-profiles made of sheet metal, which are connected to each other with an internal screw connection. The production of the upright from C-shaped upright profiles and the subsequent screw connection enables cost-effective production and simplified assembly.

The C-profiles preferably each have two inwardly directed legs, whereby when the C-profiles are joined the legs of the first C-profile and the legs of the second C-profile rest on one another and the C-profiles are screwed together via the legs. The C-profiles that are screwed together form a hollow profile as the upright. The internal screw connection is preferably formed by internal screws and nuts.

The upright or the upright profiles are designed in such a way that the internal screw connection is easily accessible from the outside, i.e. from the outer surface of the upright or the upright profiles, while the "front and side surface" of the upright as the outer surface of the cantilever arms remains free of protrusions. For the easy accessibility of the internal screw connections, access openings or recesses, in particular round punched holes, are provided on the outside of the upright profiles in the area of the internal screw connection, through which the screw connection elements and the screw connection tool can be inserted and the profiles are screwed together. To ensure good upright stability, the internal screw connections of the upright profiles are evenly spaced over the upright height.

Particularly preferably, the sheets of the upright profile have no "top" or "bottom" orientation and can be joined together as desired. The first end of a profile corresponds in cross-section and hole pattern to the second end of the profile. The profiles are therefore symmetrical. This applies both to the cross-section of the profiles and to the arrangement of the parallel rows of holes along the longitudinal direction of the upright with respect to an axis of symmetry transverse to the longitudinal direction of the upright. Such a design of the profiles is advantageous in terms of storage and assembly.

An upright foot can be provided on the upright to stabilize the cantilever rack. The upright foot preferably has a foot base on which there are two C- or U-shaped plug bases to which the upright profiles can be connected through the same hole pattern of the cantilever arm fixing. To assemble the upright foot and upright, the upright is pushed onto the plug bases. Rows of holes are provided on the outer legs of the C- or U-shaped plug bases, the arrangement of which corresponds to the hole pattern of the upright profiles when the upright is mounted on the plug bases as intended.

To increase the stability of the cantilever rack, the U-shaped plug bases are arranged with the open sides of the U-shaped cross-section facing away from each other.

Preferably, the upright profiles have double holes for fastening the cantilever arms and the plug bases. The double holes allow cantilever arms to be arranged on both sides of the upright. The plug bases are connected to the upright profiles through the same double holes of the cantilever arm fixings.

In an advantageous embodiment of the invention, the foot base consists of a hot-rolled double T-beam or a thick-walled square tube profile. Not using feet made of sheet metal profiles has advantages in use, as forklifts will not easily damage these double T-beams or thick-walled rectangular or square tubes.

The cantilever arms can also be easily inserted from the front onto the sheets of the upright and removed in the same way. The fastening ends of the cantilever arms are preferably fixed to the upright by means of socket pins with retaining ring. For locking, the pins are pushed through the upright and fixed on both sides at the holes in the fastening end of the cantilever arms by means of retaining rings.

Assembly-friendly for less experienced end customers and cost-effective is also a support foot that prevents the first upright standing alone from falling over during assembly. The support foot is temporarily connected to the upright for assembly and can be anchored to the floor.

Further advantages, features and details of the invention can be found in the following explanations of an example embodiment shown in schematic drawing figures.

Figure 2:
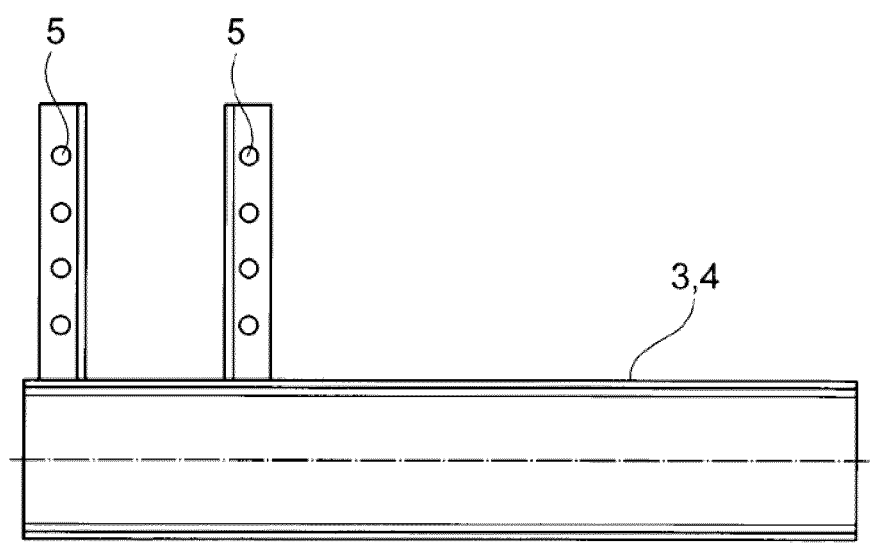
Figure 6:
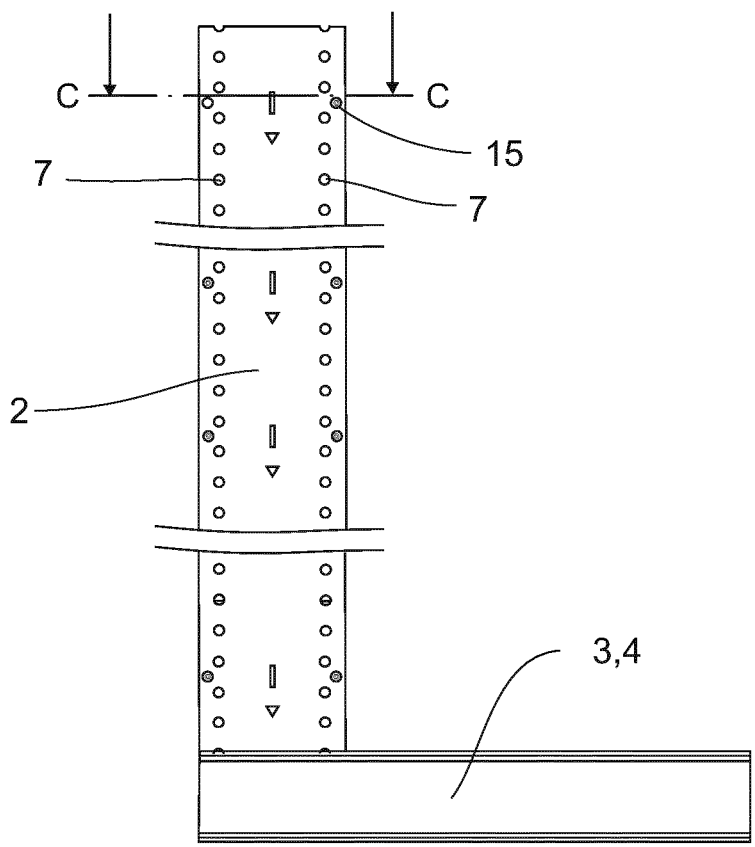
Figure 7:
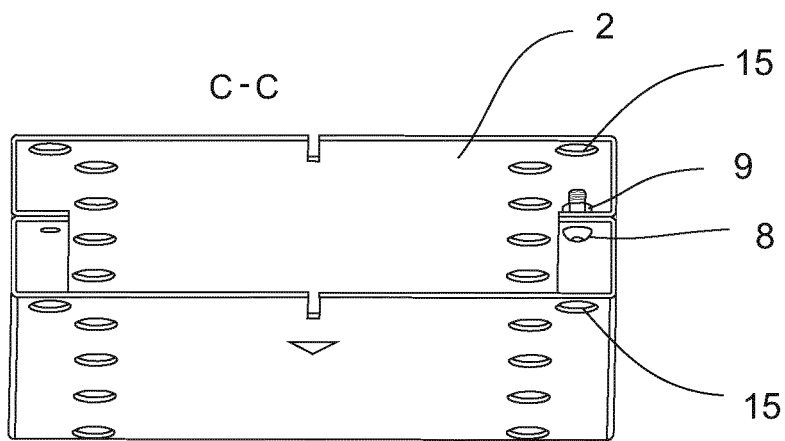
Figure 8:
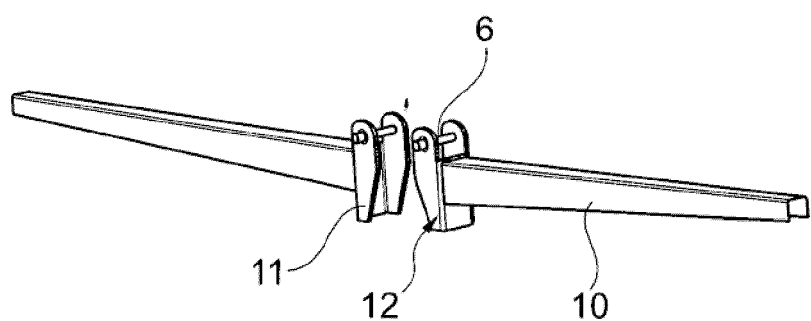
Figure 9:
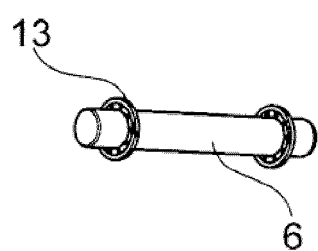

It is shown in:

FIG. 1 an upright with cantilever arms in perspective view,

FIG. 2 a side view of a foot base,

FIG. 3 an upright in perspective view with cantilever arms on both sides,

FIG. 4 a detailed perspective view of the foot base with upright/foot screw connection, FIG. 5 a cross-section of the upright with internal shell screw connection, FIG. 6 a side view of the upright with foot base from FIG. 1, FIG. 7 a perspective sectional view through section C-C of FIG. 6 with internal shell screw connection, FIG. 8 a perspective view of two cantilever arms with socket pins, FIG. 9 a perspective view of a socket pin with retaining rings.

FIG. 1 shows an upright 1 according to the invention with upright foot 3 of a cantilever rack in a first embodiment. The upright 1 consists of two C-shaped upright profiles 2 made of sheet metal, which are connected to each other by an internal screw connection and form a hollow profile. Cantilever arms 10 are arranged on the upright 1 shown in perspective, which are attached to the upright profiles 2. The upright foot 3 is formed from a foot base 4. A support foot 14 can be provided for setting up the first upright 1.

FIG. 2 shows a side view of an upright foot 3, which consists of a foot base 4 as a double T-beam and on which two plug bases 5 made of U-profiles are mounted. Rows of holes are arranged on both sides of each of the U-shaped plug bases. The plug bases 5 are arranged with their open sides of the U-shaped cross-section pointing away from each other and spaced apart in width in such a way that the upright 1 can be placed on the plug bases 5 and the rows of holes in the plug bases 5 correspond to the rows of holes in the upright.

FIG. 3 shows an upright in perspective view with cantilever arms 10 on both sides of the upright 1, the upright profiles 2 of which have two longitudinally parallel rows of holes 7 which serve to fix the plug-in bolts of the cantilever arms 10 and the plug bases 5 of the upright feet 3. The upright profiles 2 are firmly connected in the base area 3, 4.

As can be seen from FIG. 4, the upright profiles 2 are firmly connected to the base area 3, 4 in the detailed view shown, the details of which are particularly clear from FIG. 5. The two plug bases 5 are located between the upright profiles 2 and are screwed to them. The screw heads of the screw connection of the upright profiles and base areas 3, 4 can be seen. In addition, two access openings 15 for the internal screw connection of the C-shaped upright profiles are arranged in the area shown on both sides of the rows of holes to which the plug bases 5 are attached, offset laterally from the rows of holes.

FIG. 5 also shows the internal screw connection of the C-shaped upright profiles 2. The inward-facing legs of the upright profiles 2 are in contact with each other. The internal screw connection indicated by the screw 8 and nut 9 is made through the legs of the upright profiles 2. The easy accessibility of the internal screw connection from the outside of the upright 1 or the upright profiles 2 is shown by the screw 8 and nut 9 shown outside the upright 1. A recess is provided on the outside of the upright profiles through which the bolts 8 and nuts 9 and the screw connection tool can be inserted.

FIG. 6 shows a side view of the upright 1 with upright foot 3 from FIG. 1 without cantilever arms 10. The two rows of holes or double holes 7 arranged in the longitudinal direction of the upright of one upright profile 2 for height-adjustable fastening of the cantilever arms 10 and for fastening of the plug bases 5 can be seen. The screw connection with the plug bases 5 is not shown in the illustration. Access openings 15 for internal screw connections 8, 9 of the upright profiles 2 can be seen distributed over the upright height, in which the internal screw connections are indicated. The access openings 15 and the internal screw connections 8, 9 are distributed at uniform intervals in the longitudinal direction of the upright over the upright height. Furthermore, the upright profile symmetry is clearly visible. The rows of holes of the "upper" end of the upright profile 2 are arranged symmetrically to the rows of holes of the "lower" end of the upright profile 2.

FIG. 7 shows a perspective sectional view through the section C-C of FIG. 6 with internal screw connection 8, 9. In addition to the illustration in FIG. 5, the access openings 15 can be seen from the outer surface of the upright 1 or the upright profiles 2 for the internal screw connection 8, 9.

FIG. 8 shows a perspective view of two cantilever arms 10 with arrangement of the plug-in bolts 6 and wherein openings 12 for shims for height leveling of the cantilever arms 10 are arranged at the fastening end 11.

FIG. 9 shows a plug-in bolt 6 with retaining ring 13.

The invention is not limited to the embodiment example of an upright with cantilever arms shown and described in the figures of the drawing. Further designs, which are within the manufacturing discretion of the skilled person, are possible depending on the design of the cantilever rack and the requirements placed on it, provided that they correspond to the object of the invention and result in a solution to the task set out at the beginning. For example, profiles other than those shown can also be used for the upright and for the cantilever arm, and the arrangement, size and shape of the recesses of the upright and of the cantilever arm can also be selected and varied accordingly by a skilled person for a special use of the cantilever rack.

LIST OF REFERENCE SIGNS

1 Upright
2 Stud profile sheets
3 Upright foot
4 Foot base
5 Plug base—C profile
6 Socket pin
7 Double hole
8 Screw with
9 Nut
10 Cantilever arm
11 Fastening end
12 Opening for shims for height adjustment
13 Retaining ring
14 Support foot
15 Access opening for internal bolting

The invention claimed is:

1. A cantilever rack for storing goods between two uprights, wherein at least one upright includes cantilever arms extending from the at least one upright,
the at least one upright having two parallel rows of holes arranged in a longitudinal direction of the at least one upright for height-adjustable fastening of the cantilever arms,
wherein the at least one upright includes upright profile metal sheets with C-profiles which are connected to one another with an internal screw connection and form a hollow profile, the internal screw connection being accessible from an outer surface of the upright profile metal sheets,
wherein the upright profile metal sheets include a first upright profile metal sheet having two inwardly directed legs and a second upright profile metal sheet having two inwardly directed legs, wherein the inwardly directed legs of the first upright profile metal sheet are fastened to the inwardly directed legs of the second upright profile metal sheet by internal screws and nuts to form the internal screw connection, and wherein the internal screws penetrate the inwardly directed legs of the first upright profile metal sheet and the inwardly directed legs of the second upright profile metal sheet.

2. The cantilever rack of claim 1, further comprising an upright foot mounted on the at least one upright, wherein the upright foot has a foot base on which there are two C-or U-shaped plug bases having outer legs with rows of holes, wherein the rows of holes of the plug bases have an arrangement corresponding to the two parallel rows of holes of the corresponding upright profile metal sheets when the at least one upright is mounted on the plug base.

3. The cantilever rack of claim 2, wherein the foot base consists of a hot-rolled double T-beam or a square tube profile.

4. The cantilever rack of claim 2, wherein the two C-or U-shaped plug bases are arranged with open sides of a U-shaped cross-section facing away from each other.

5. The cantilever rack of claim 1, wherein the_upright profile metal sheets are symmetrical, wherein a cross-section of a first end of each of the upright profile metal sheets corresponds to a cross-section of a second end of each of the upright profile metal sheets, and wherein an arrangement of the two parallel rows of holes of the first end of each of the upright profile metal sheets corresponds to an arrangement of the two parallel rows of holes of the second end of each of the upright profile metal sheets.

6. The cantilever rack of claim 1, wherein a fastening end of the cantilever arms is fixed to the at least one upright with at least one socket pin inserted into at least one hole of the two parallel rows of holes and held into place with at least one retaining ring.

7. The cantilever rack of claim 1 with a support foot, wherein the support foot can be temporarily connected to the at least one upright and is adapted to be anchored to a ground surface for assembly.

8. The cantilever rack of claim 1, wherein access openings or recesses are provided on the outer surface of the upright profile metal sheets in an area of the internal screw connection, through which screws and nuts and a screw connection tool can be inserted and the upright profile metal sheets are screwed together, wherein the access openings or recesses in the area of the internal screw connection are arranged on both sides of the two parallel rows and offset laterally from the two parallel rows of holes.

9. The cantilever rack of claim 1, further including a plurality of internal screw connections between the upright profile metal sheets, wherein the plurality of internal screw connections of the upright profile metal sheets are evenly spaced over an upright height.

10. An upright for a cantilever rack wherein the upright consists of upright profile metal sheets with C-profiles, wherein the upright profile metal sheets are connected to each other with an internal screw connection and form a hollow profile, the internal screw connection being accessible from an outer surface of the upright profile metal sheets,
wherein the upright profile metal sheets include a first upright profile metal sheet having two inwardly directed legs and a second upright profile metal sheet having two inwardly directed legs, wherein the inwardly directed legs of the first upright profile metal sheet are fastened to the inwardly directed legs of the second upright profile metal sheet by internal screws and nuts to form the internal screw connection, and wherein the internal screws penetrate the inwardly directed legs of the first upright profile metal sheet and the inwardly directed legs of the second upright profile metal sheet.

11. A cantilever rack for storing goods between two uprights, wherein at least one upright includes cantilever arms extending from the at least one upright, the at least one upright having two parallel rows of holes arranged in a longitudinal direction of the at least one upright for height-adjustable fastening of the cantilever arms, wherein the at least one upright consists of upright profile metal sheets with C-profiles which are connected to one another with an internal screw connection to form a hollow profile, the internal screw connection being accessible from an outer surface of the upright profile metal sheets, wherein the upright profile metal sheets each have two inwardly directed legs, whereby when the upright profile metal sheets are connected to one another, the inwardly directed legs of a first upright profile metal sheet and the inwardly directed legs of a second upright profile metal sheet rest on one another and the first and second upright profile metal sheets are screwed together through the inwardly directed legs, thereby forming the internal screw connection, wherein access openings or recesses are provided on the outer surface of the first and second upright profile metal sheets in an area of the internal screw connection, through which screw connection elements and a screw connection tool are inserted and the first and second upright profile metal sheets are screwed together.

* * * * *